Jan. 13, 1931.  J. GOMEZ Y VIRTO  1,788,604
METHOD AND APPARATUS FOR PLOWING
Filed July 24, 1929  4 Sheets-Sheet 2

Inventor
Jose Gomez y Virto
By Jacobi & Jacobi
Attorneys

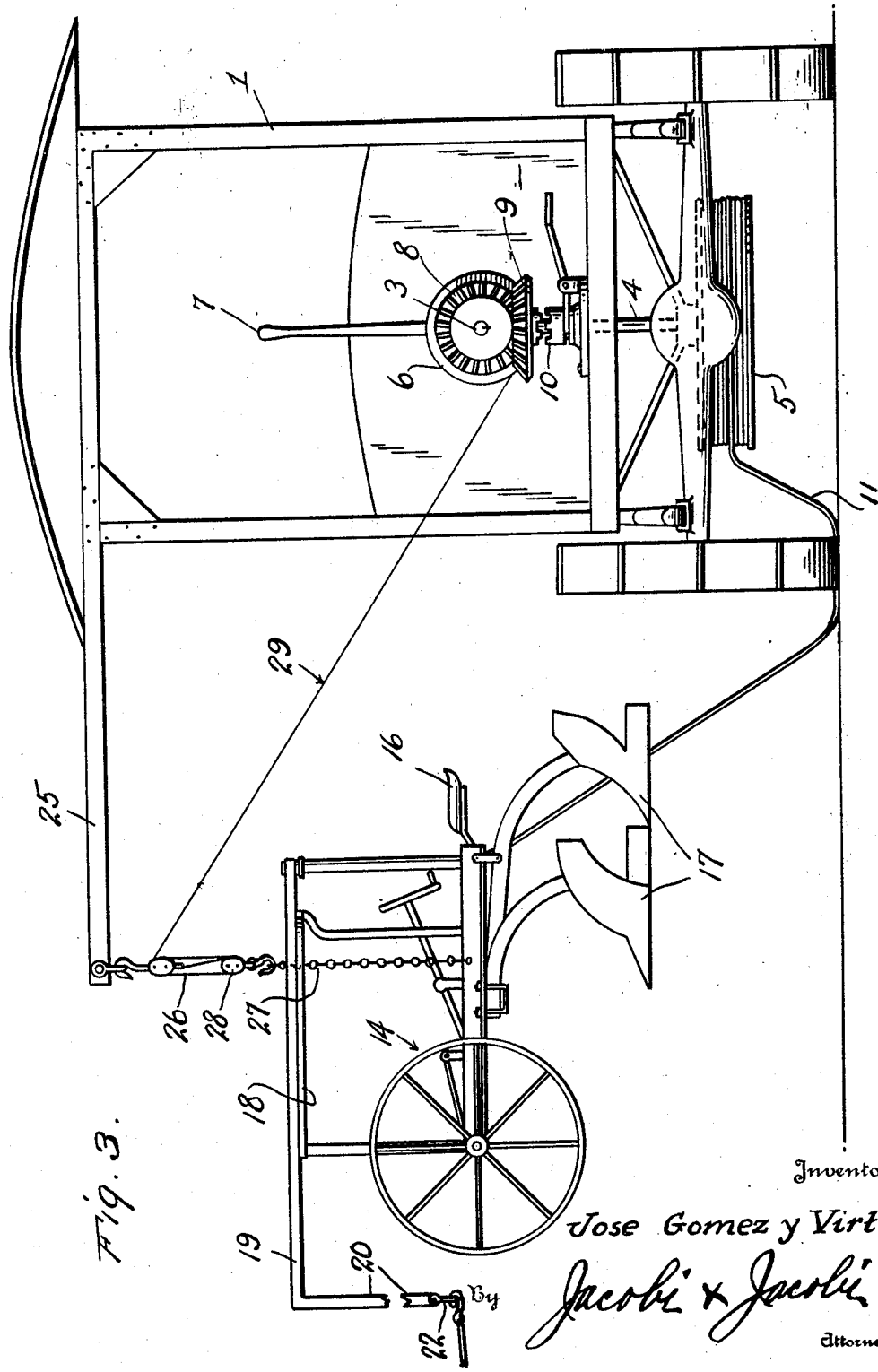

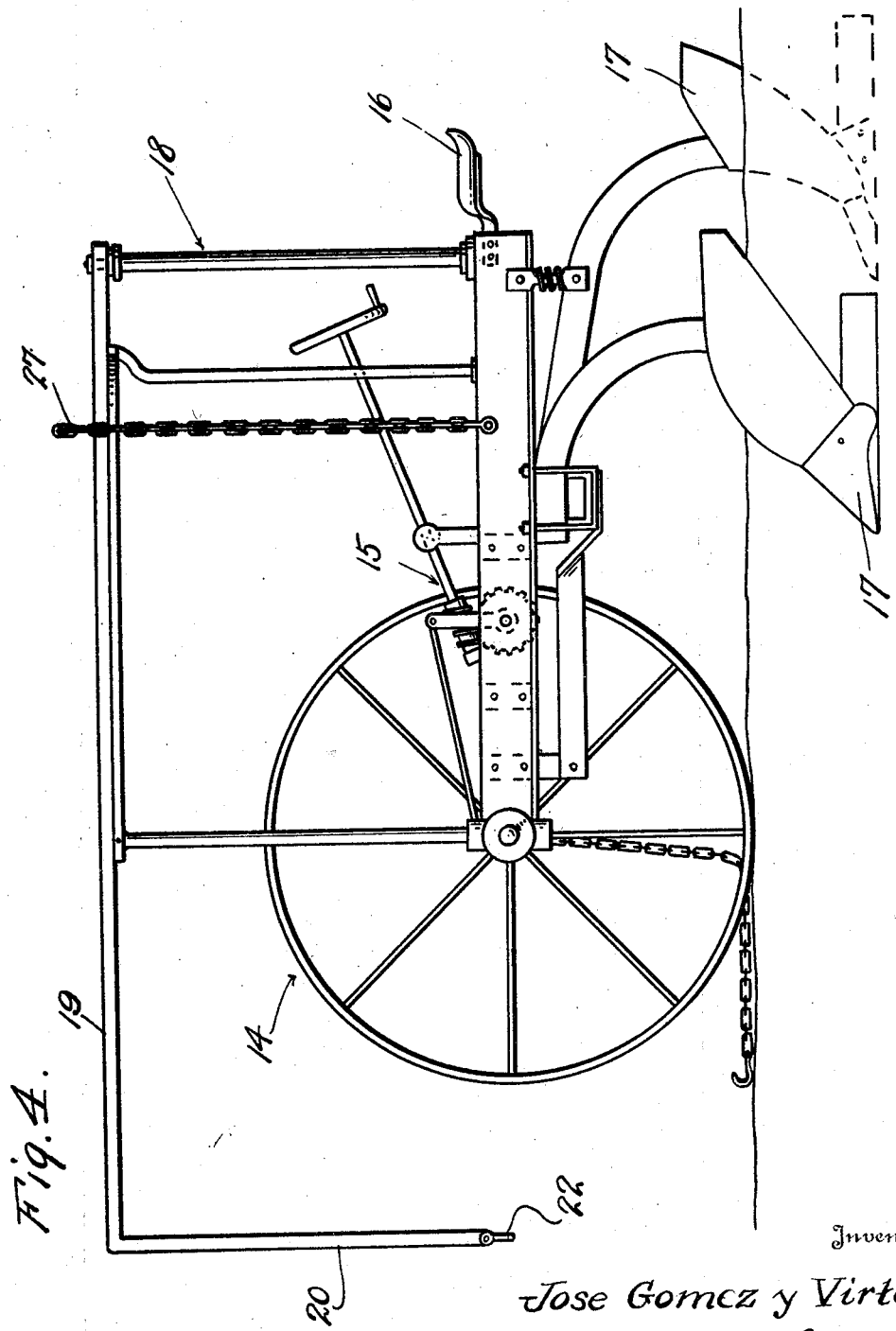

Patented Jan. 13, 1931

1,788,604

UNITED STATES PATENT OFFICE

JOSÉ GOMEZ y VIRTO, OF LA CASTELLANA, PHILIPPINE ISLANDS

METHOD AND APPARATUS FOR PLOWING

Application filed July 24, 1929. Serial No. 380,605.

The present invention relates to improvements in methods or systems of cultivation and has reference more particularly to an improved method and apparatus for plowing large areas of ground in a positive and expeditious manner.

One of the important objects of the present invention resides in the provision of a pair of self-propelled tractors or other vehicles that are arranged to travel in parallel relation at opposite sides of the field or crops, a plow unit being adapted to travel transversely across the field between the vehicles to plow up the land between the growing crops, and means being provided for operatively connecting the plow with the respective vehicles for effecting movement of the plow unit across the field.

A further object is to provide a novel method and apparatus of the above mentioned character wherein each vehicle is equipped with a winding winch or drum having associated therewith a cable the free end of which is adapted to be detachably connected to the plow unit or cultivator in such a manner as to effect the unwinding of one of the cables from its drum simultaneously with the winding up of the other cable around its drum or winch.

A further object is to provide an apparatus of the above mentioned character which includes means for facilitating the raising of the plow or cultivator after the same has traversed one row to permit the cultivator or plow unit to be disposed in a reverse direction for traversing the next adjacent row when the unit is again lowered.

A further object is to provide an apparatus of the above mentioned character wherein the plow or cultivator unit is equipped with a laterally extending arm for disposition above the growing crops and to which arm is connected a free end of the cable that is unwound during the movement of the plow or cultivator unit across the field, the purpose of which is to provide means for laying or depositing the aforementioned cable in the next adjacent row that is to be traversed by the plow or cultivator unit.

Another important object of the invention is to provide an apparatus of the above mentioned character which will reduce the number of men necessary to plow up a large area of ground and at the same time, perform the plowing operation in a quick and efficient manner.

Other objects and advantages of this invention will become apparent during the course of the following description.

In the accompanying drawings forming a part of this specification and in which like numerals designate like parts throughout the several views, Figure 1 is a top plan view showing the tractors at the opposite sides of the field and the plow or cultivator unit in the act of traversing the field and being operatively connected to one of the vehicles, the dotted lines representing the position of the respective parts when the plowing or cultivating means is positioned in the next row.

Figure 3 is a view similar to Figure 2 showing the plow or cultivator unit in its reversed position, ready to be lowered to traverse a row, and Figure 4 is an enlarged side elevation of the plow or cultivator unit.

Figure 1:
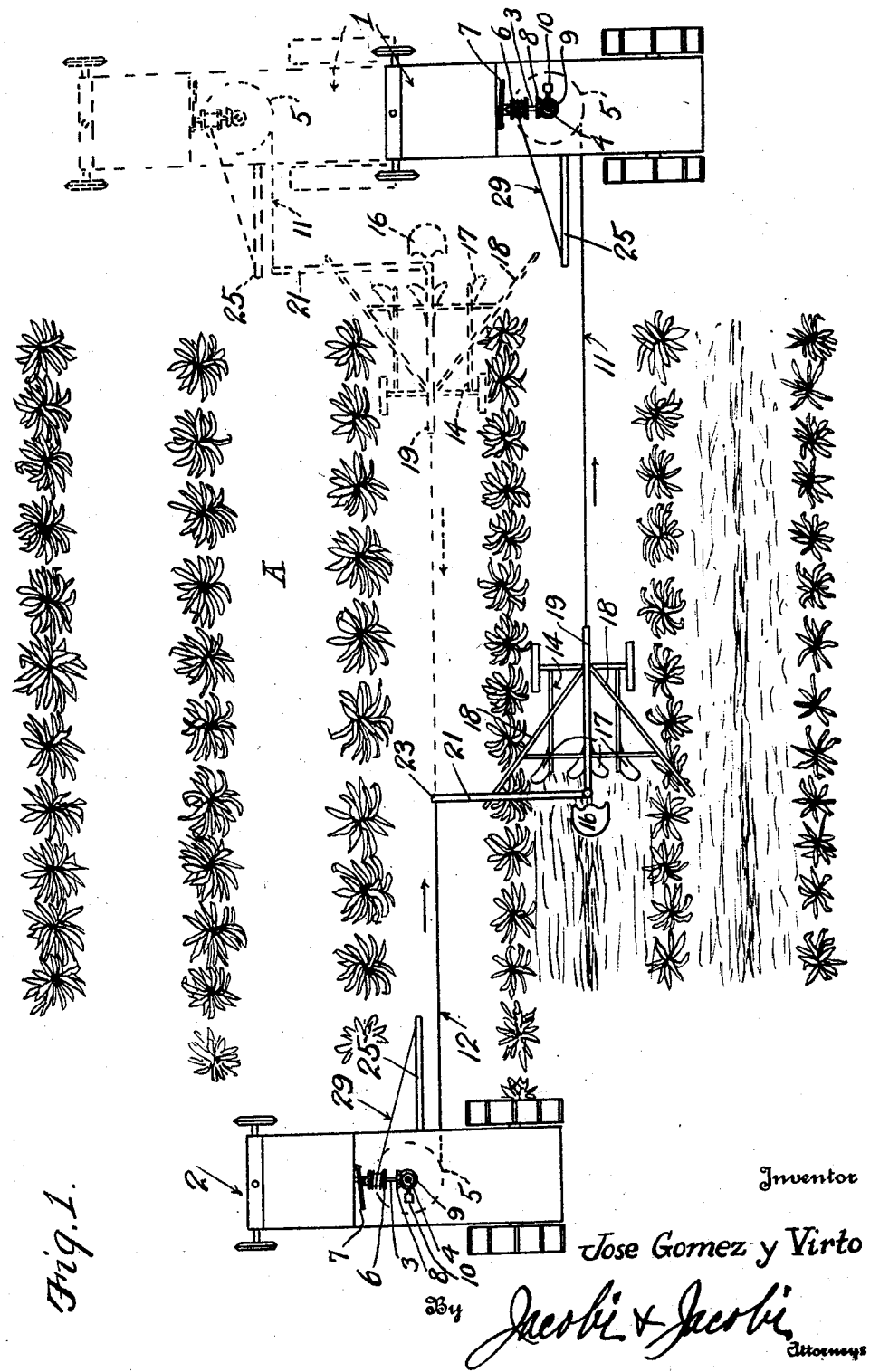

In the drawings, wherein for the purpose of illustration is shown a preferred embodiment of my invention, the numerals 1 and 2 designate generally two motor driven tractors of any conventional construction and which vehicles are adapted to move substantially parallel to each other over paths at each side of a field A that is to be plowed. This arrangement is clearly shown in Figure 1 of the drawings. As each of the vehicles is of the same construction, the description of one is thought to suffice for the description of both. Each vehicle is equipped with a motor, not shown in detail, for operating a main power shaft 3. A driven shaft 4 is arranged at right angles with respect to the power shaft 3 and is adapted to carry at its lower end, a drum or winch 5, the purpose of which will be hereinafter more fully described.

Figure 2:
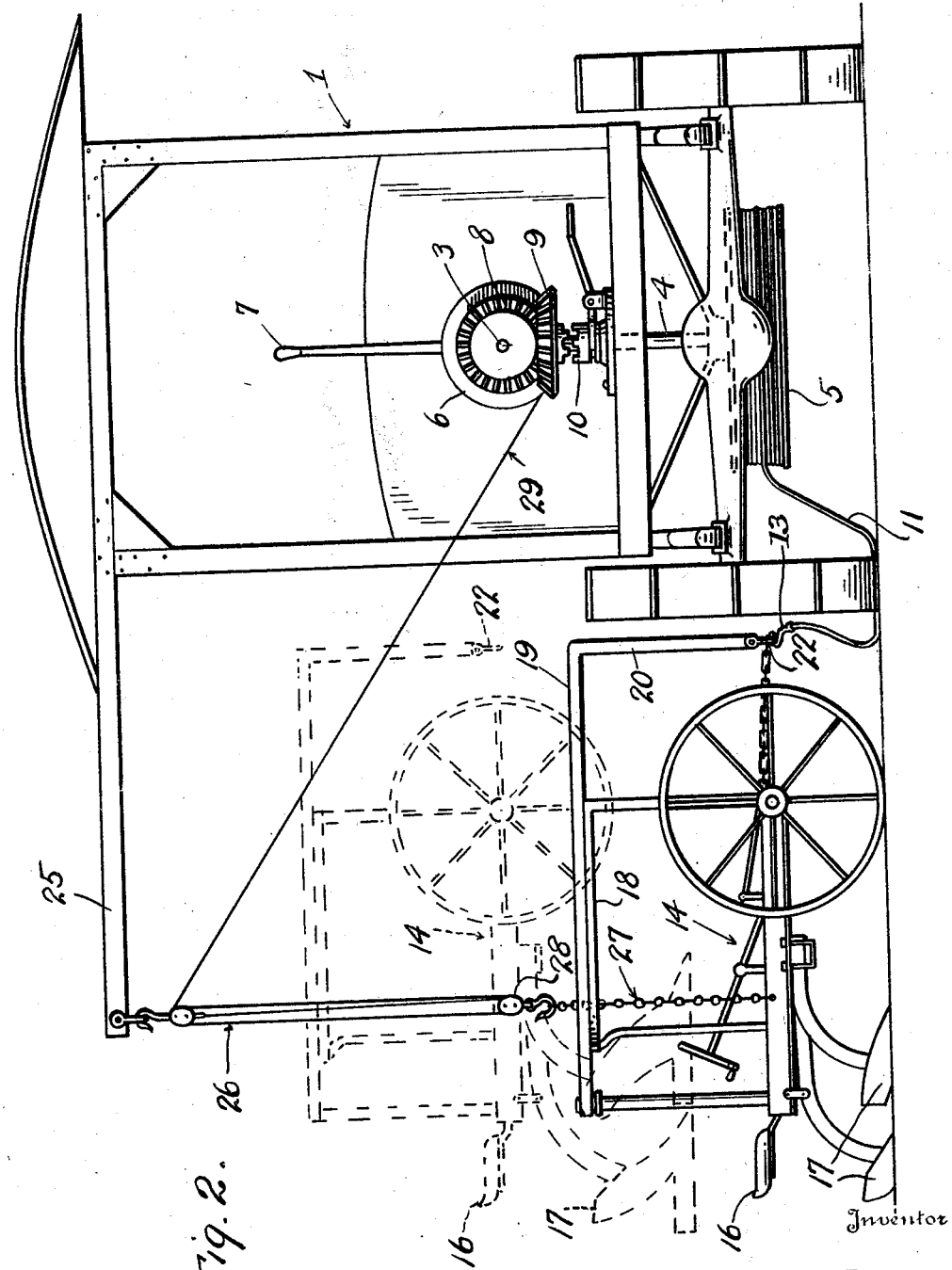
Figure 2 is an enlarged detail view of one of the vehicles showing the plow or cultivator unit after the same has traversed one row and disclosing the means for raising the unit to facilitate the reverse positioning of the same, the dotted lines disclosing the unit in its raised position.

Loosely mounted on the power shaft 3 is a drum 6 and appropriate clutching means may be provided for operatively connecting the drum 6 with the drive shaft 3 whereby the drum 6 will be operated simultaneously with the power shaft 3 and the lever for controlling this clutch mechanism is shown at 7 in Figure 2.

Intermeshing gears 8 and 9 are associated with the power shaft 3 and the relatively disposed driven shaft 4 for connecting the same together and a clutch mechanism shown generally at 10 is associated with the shaft 4.

An elongated cable is fastened at one end to each drum or winch 5, the cable that is associated with the drum carried by the vehicle 1 being designated preferably by the numeral 11 while the cable that is attached to the drum associated with the vehicle 2 is designated by the numeral 12. A hook 13 is attached to the free end of each cable.

With reference now more particularly to Figure 4, is shown generally a plow or cultivator unit of the wheeled type and this unit is designated generally by the numeral 14. The plow or cultivator unit may be and is preferably provided with a steering mechanism 15 to enable the occupant of the seat 16 to steer the unit while the same is in operation. The earth engaging implements attached to the frame of the unit 14 are shown at 17.

In order to adapt this plow or cultivator unit to my improved system or method of cultivating or plowing the ground, there is arranged on the frame of the unit 14 a superframe structure 18 that supports the longitudinally extending beam 19, the forward end thereof being directed downwardly as at 20 while the rear end of this beam is disposed laterally as at 21. An eye member 22 is suspended from the lower end of the depending portion 20 and carried by the free end of the laterally disposed arm 21 is a similar hook receiving eye 23. The outer end portion of the laterally disposed arm 21 is disposed downwardly.

The method by which I propose to plow up a large tract of land by my improved apparatus may be briefly stated as follows. The vehicle 1 is positioned at one side of the field A while the vehicle 2 is positioned at the opposite side of the field and forwardly of the vehicle 1. With the vehicles thus arranged the plowing or cultivating unit 14 is initially positioned at the edge of the field remotely opposite the vehicle 1. The cable 11 that is unwound from the winch 5 has its hook 13 engaged in the eye 22 while the eye 23 associated with the laterally extending arm 21 is connected to the hook carried by the free end of the cable 12.

Now when the shaft 4 is driven, the winch or drum 5 on the vehicle 1 will cause the cable 11 to be wound around the winch and at the same time will move the plow or cultivator unit 14 across the field with the plows or cultivators 17 digging up the soil. At the same time, the cable 12 will become unwound from its drum and this arm 21 will tend to lay the cable 12 in the next adjacent row that is to be plowed. The arm 21 is of such height as to clear the growing crops, thus obviating the necessity of having to manually lift the cable 12 upwardly over the crops.

After the plow or cultivator unit 14 has traversed one row and the same reaches the side of the vehicle 1, as shown in the full lines in Figure 2 the unit must be raised and reversed prior to the plowing of the next adjacent row at this end, and means is provided for effecting the raising of the plow or cultivator unit. This means as associated with each vehicle comprises a beam 25 that extends beyond one side of each vehicle at the top thereof and a block and tackle 26 suspended from the outer end of each beam. Any appropriate suspension means such as shown at 27 may be attached to the frame of the unit 14 for attachment to the hook of the lower block 28 and a cable 29 that is associated with the block and tackle is attached to the drum 6 and when the clutch lever 7 is actuated to operatively connect the drum 7 with the power shaft 3, the block and tackle will raise the unit 14 to the position shown in the dotted lines in Figure 2. While in its raised position, it is reversed and placed in position for its return trip across the field.

While the unit 14 is in the air, the vehicle 1 is moved to the position shown in the dotted lines in Figure 1 so as to be ahead of the vehicle 2 and directly in line with the second row that is to be cultivated with reference to the row that has just been plowed up by the unit 14.

When the parts are arranged as shown in the dotted lines in Figure 2, the cable 12 is connected to the eye 22 while the cable 11 is connected to the eye 23 and then the winch 5 associated with the vehicle 2 is brought into operation to wind up the cable 12 and to simultaneously move the plow or cultivator unit 14 across the field toward the vehicle 2. At the same time, the cable 11 will be unwound from its winch or drum so that said cable will be deposited in the next row that is to be plowed.

It is of course to be understood that the laterally disposed arm 21 is so associated with the longitudinally extending beams 19 as to permit said arm to be disposed alternately on the right and left hand side of the super-frame structure 18 so that when the plow or cultivator unit travels across the field said laterally disposed arm will at all times be disposed on the unplowed side.

This method is repeated until the entire field has been cultivated. The provision of an apparatus of the above mentioned character for carrying out my improved method of cultivating or plowing a large tract of land will save considerable time and labor and at the same time efficiently cultivate the land.

The simplicity of my apparatus enables the parts to be readily and easily connected and disconnected and no material operations are necessary in order to equip conventional plow or cultivator unit with the necessary attachments thereto to permit connection of the unit with the respective vehicles that travel along the respective sides of the field.

While I have shown a preferred embodiment of my invention it is to be understood that minor changes in the size, shape and arrangement of parts may be resorted to without departing from the spirit of the invention and the scope of the appended claims.

What I claim is:

1. In combination, two vehicles adapted to be positioned at opposite sides of a large tract of land to be plowed, a plow unit for movement across the land between the vehicles, a rotary winch mounted on each vehicle, a cable attached at one end to each winch, means for connecting the free ends of the cables with the units for unwinding one cable from its winch while the other is being wound upon its winch to draw the unit across the land, and a hoist carried by each vehicle including a block and tackle adapted to be connected with the cable engaging means of the plow unit whereby the plow may be raised to an elevated position and after being reversed and transported to a new position returned to a lowered position upon the ground.

2. In combination, two vehicles adapted to be positioned at opposite sides of a large tract of land to be plowed, a plow unit for movement across the land between the vehicles, a rotary winch mounted on each vehicle, a cable attached at one end to each winch, means carried by the unit engageable with the free ends of the cables for simultaneously and alternately winding and unwinding the cables with respect to their winches during the movement of the unit across the land, and a hoist carried by each vehicle for raising the plowing unit out of engagement with the ground after the same has reached one side of the land and permit reverse positioning of the unit while in a suspended position while the vehicle carrying the unit is moved forwardly.

3. In combination, two vehicles adapted to be positioned at opposite sides of a large tract of land to be plowed, a plow unit for movement across the land between the vehicles, a rotary winch mounted on each vehicle, cables each attached at one end to a respective winch, means carried by the unit engageable with the free ends of the cables for simultaneously and alternately winding and unwinding the cables with respect to their winches during the movement of the unit across the track, and means carried by the unit for connection to the cable that is unwound from its winch to constitute a guide where the unit is to be positioned when plowing the next adjacent row of land.

4. Means for cultivating a large tract of land comprising vehicles disposed at opposite sides of the track out of opposed relation to each other and progressively moved along sides of the tract to alternately dispose one vehicle in advance of the other, a winch carried by each vehicle including a winding drum, cables wound upon said drums and adapted to extend across the tract in opposite directions in spaced substantially parallel relation to each other and one being wound upon its drum while the other is being unwound, a portable earth working implement, a frame extending upwardly from said implement and adapted to be engaged by the cable to be wound upon its drum and drawn across the tract, means carried by said frame to engage the other cable and draw the same across the tract as the implement is moved, and means carried by each vehicle to lift the implement and support the same in an elevated position while the vehicle carrying the implement is moved to an advanced position.

5. Means for cultivating a large tract of land comprising vehicles disposed at opposite sides of the tract out of opposed relation to each other and progressively moved along sides of the tract to alternately dispose one vehicle in advance of the other, a winch carried by each vehicle including a winding drum, cables wound upon said drums and adapted to extend across the tract in opposite directions in spaced substantially parallel relation to each other and one being wound upon its drum while the other is being unwound, a portable earth working implement, a frame extending upwardly from said implement and adapted to be engaged by the cable to be wound upon its drum and drawn across the tract, an arm pivoted at one end to said frame, and movable to a position extending from a selected side of the implement for engagement by a cable to be unwound and implement lifting means carried by each vehicle.

In testimony whereof I affix my signature.

JOSÉ GOMEZ y VIRTO.